(12) United States Patent
Tajima

(10) Patent No.: US 7,120,010 B2
(45) Date of Patent: Oct. 10, 2006

(54) DISPLAY UNIT (75) Inventor: Hisao Tajima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 186 days.

(21) Appl. No.: 10/318,069

(22) Filed: Dec. 13, 2002

(65) Prior Publication Data
US 2003/0117053 A1 Jun. 26, 2003

(30) Foreign Application Priority Data
Dec. 25, 2001 (JP) .......................... 2001-391643
Nov. 29, 2002 (JP) .......................... 2002-348056

(51) Int. Cl.
G06F 1/16 (2006.01)

(52) U.S. Cl. .................. 361/681; 248/917; 348/790; 348/794

(58) Field of Classification Search ................ 361/681, 361/682; 348/739, 790, 794, 325, 836; 248/917, 248/918
See application file for complete search history.

(56) References Cited

U.S. PATENT DOCUMENTS

| 5,363,276 A | * | 11/1994 | Crockett | 361/752 |
| 6,181,390 B1 | * | 1/2001 | Wang et al. | 349/58 |
| 6,288,489 B1 | | 9/2001 | Isohata et al. | 313/582 |
| 6,477,039 B1 | | 11/2002 | Tajima | 361/681 |
| 6,532,152 B1 | * | 3/2003 | White et al. | 361/692 |
| 6,560,092 B1 | * | 5/2003 | Itou et al. | 361/681 |
| 2002/0008790 A1 | | 1/2002 | Tajima | 349/2 |

FOREIGN PATENT DOCUMENTS

| JP | 11-272182 | 10/1999 |
| JP | 2000-321989 | 11/2000 |

* cited by examiner

Primary Examiner—Dean A. Reichard
Assistant Examiner—Carmelo Oliva
(74) Attorney, Agent, or Firm—Fitzpatrick, Cella, Harper & Scinto (57) ABSTRACT The present application discloses a display unit in which a display unit is supported by a support. Particularly, in the configuration in which are provided a display section including a face plate and a rear plate arranged opposite to the face plate and a support supporting the display section, the display section is bonded to and supported by the support.

16 Claims, 6 Drawing Sheets

DISPLAY UNIT

BACKGROUND OF THE INVENTION

1. Field of the Invention

The present invention relates to a display unit having a display section which displays, for example, information such as characters and images, and particularly, to a supporting structure for supporting the display section.

2. Description of the Related Art

A flat-thin panel type display unit using an electron emission element, plasma discharge, liquid crystal or a vacuum fluorescent display tube is used, for example, in a television set, a terminal monitor of a computer, an advertising display, and a sign. Recently, a wall-hanging television set having a screen size larger than that of a 40-in. screen has been attracting attention, positively utilizing features of the flat-thin panel type display unit for television sets.

A display unit of this type comprises, as a basic configuration, a display section which displays information such as characters and images, a controller having an electric circuit section which controls the display section, a support which supports the display section and the controller, and an outer enclosure which covers the display section, the controller, and the support.

For a supporting structure of the display section of the conventional display unit based on, for example, plasma discharge, there is known a configuration in which the back side of the display section is bonded and secured to the support via a double-sided adhesive tape. This configuration is disclosed in Japanese Patent Application Laid-Open No. 11-272182.

Also, a configuration disclosed in Japanese Patent Application Laid-Open No. 2000-321989 is proposed as a supporting structure of the display unit.

SUMMARY OF THE INVENTION

The invention of the display unit of the present application is configured as follows.

The present invention provides a display unit comprising a display section having a face plate and a rear plate arranged opposite to the face plate; and a support which supports the display section; wherein the display section is bonded to the support on the periphery of the front side thereof and supported thereby.

Particularly, for the support, a configuration in which the support has a portion extending from the bonded portion of the display section toward the rear side beyond the rear plate may suitably be adopted.

A configuration in which the display section comprises a rectangular main surface and the support, connects a plurality of supporting members corresponding to the individual sides on the periphery of the display section may suitably be adopted.

The above-mentioned connection should preferably permit easy release of connection. More specifically, a configuration in which the individual supporting members are connected with screws may suitably be adopted.

A configuration in which the supporting members, when making a relative displacement until the supporting members and the display section are separated from each other, are formed into a shape not having a portion that interferes with members other than the supporting members of the display unit may suitably be adopted.

A configuration in which the display unit has a driving circuit which drives the display section at a position closer to the back side of the display unit than the display section, and wiring drawn from an end portion of the display section is connected to the driving circuit, may suitably be adopted.

Particularly, it is possible to suitably adopt a configuration in which the support has a portion extending from the bonded portion of the display section closer to the back side of the display unit than the rear plate; the bonded portion of the display section and the portion extending from the bonded portion closer toward the back side of the display unit closer than the rear plate are integrally formed; and the wiring passes through the integrated form of the bonded portion of the display section and the portion extending from the bonded portion toward the back side of the display unit beyond the rear plate, to connect the driving circuit and the display section. The description that the bonded portion of the display section and the portion extending from this bonded portion toward the back side of the display unit beyond the rear plate are integrally formed means that these portions are not connected by connecting means such as screws after separate formation of the individual portions.

Further objects, features, and advantages of the present invention will become apparent from the following description of the preferred embodiments (with reference to the attached drawings).

DESCRIPTION OF THE PREFERRED EMBODIMENTS

Preferred embodiments of the present invention will now be described in detail.

Particularly, embodiments permitting achievement of a lighter weight of the display unit as a whole and simultaneous achievement of a higher rigidity will be described.

The following description will particularly cover embodiments that permit simultaneous achievement of a lighter weight and a higher rigidity of the support and the entire display unit, which achievement was difficult in a configuration in which only the back of the display section was secured to the support by a double-sided adhesive tape.

An embodiment of the invention permitting simultaneous achievement of a smaller thickness and a lighter weight of a display unit having a relatively large-sized screen and reduction of the manufacturing cost and the recycling cost will be described.

A flat panel type display unit, a concrete embodiment of the present invention, will be described with reference to the drawings.

Figure 1:
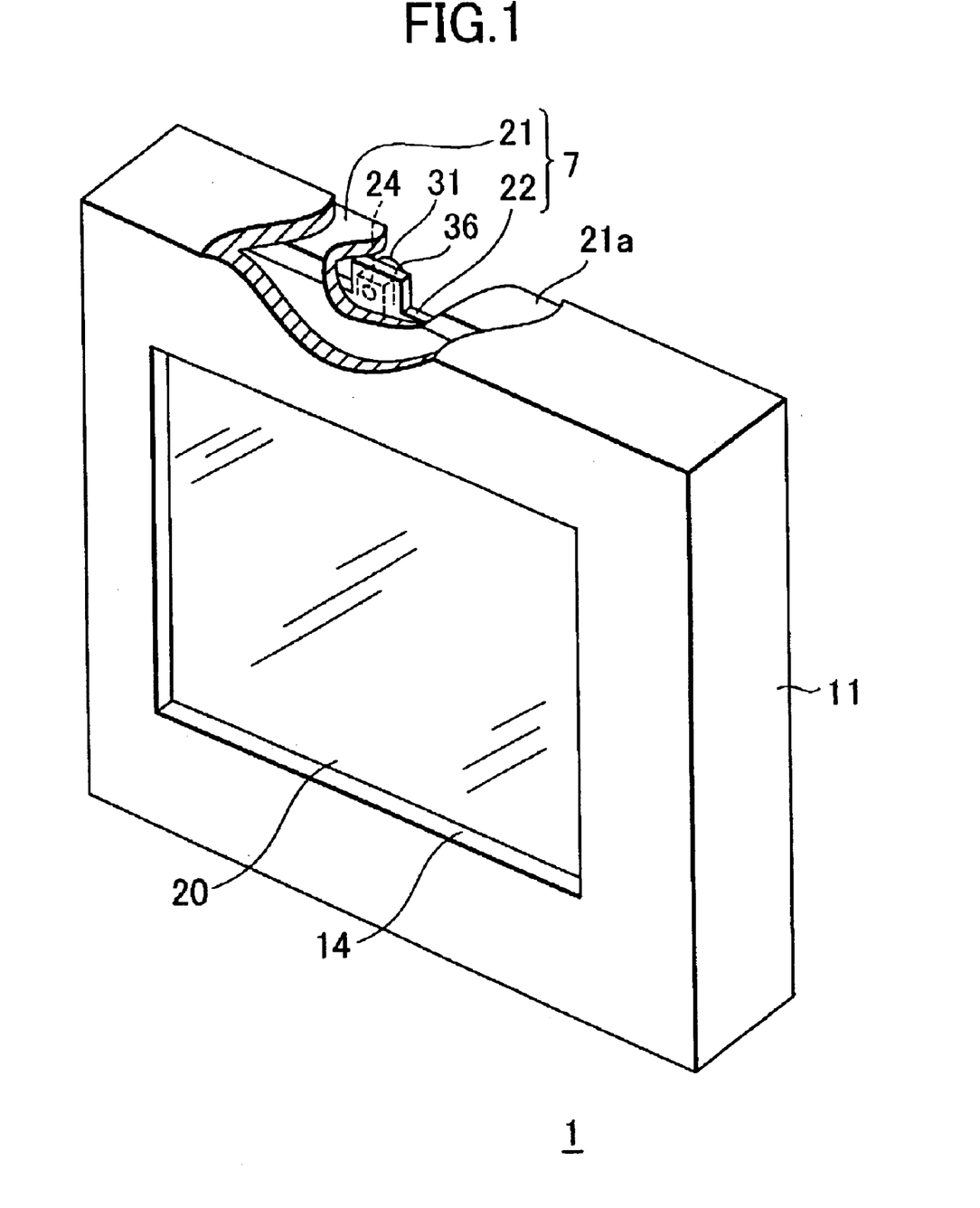
FIG. 1 is a partially cut-away perspective view illustrating the display unit of an embodiment of the present invention.
Figure 2:
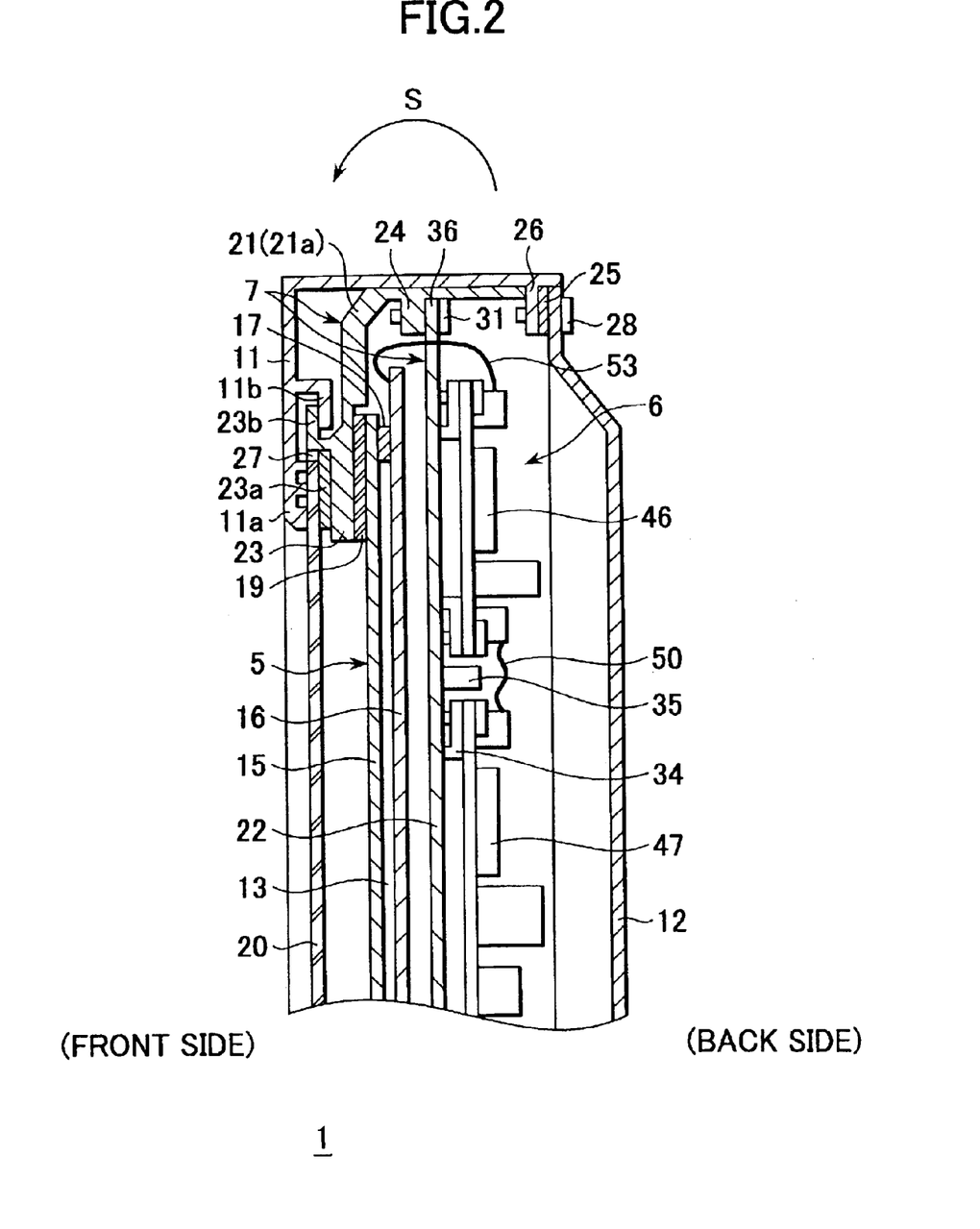
FIG. 2 is a longitudinal sectional view illustrating the display unit shown in FIG. 1.
Figure 3:
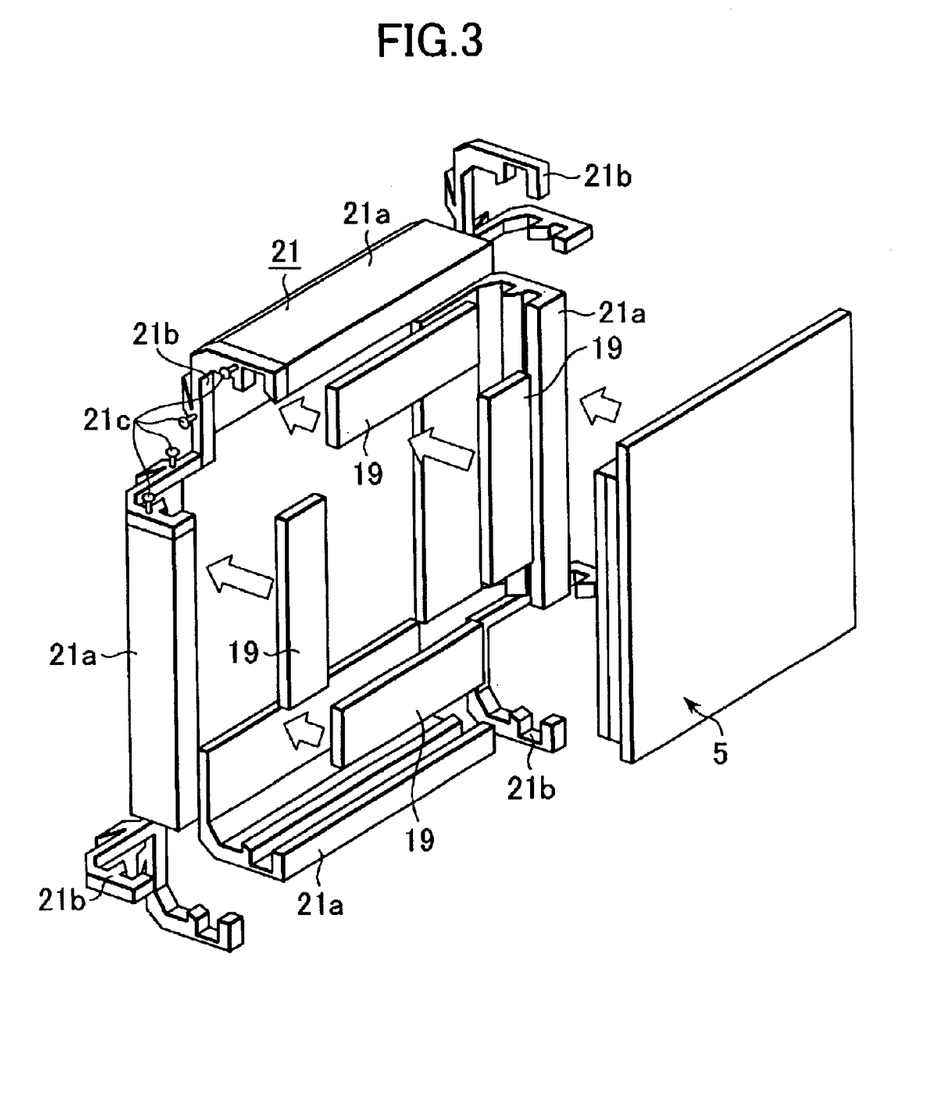
FIG. 3 is a partial perspective view of the first embodiment of the invention.
Figure 4:
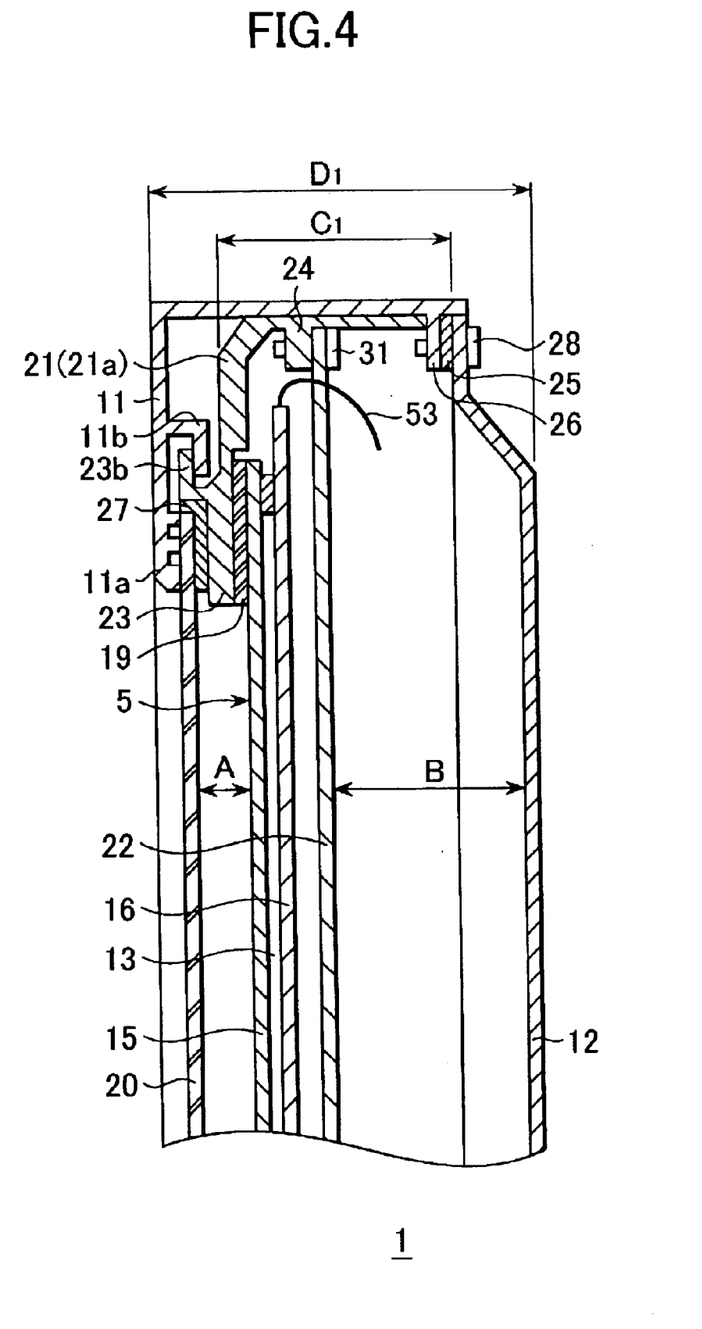
FIG. 4 is a longitudinal sectional view of the structural members illustrating the first embodiment of the invention.

FIG. 1 is a partially cut-away perspective view of the display unit of this embodiment; FIG. 2 is a longitudinal sectional view of the display unit; FIG. 3 is a plan view illustrating a state in which an outer enclosure is removed from the display unit from the back side; and FIG. 4 is a partially enlarged longitudinal sectional view.

As shown in FIGS. 1, 2, and 3, the display unit 1 comprises a display section 5 which displays various pieces of information such as characters and images; a controller 6 which controls the display section 5; a support 7 which supports the display section 5 and the controller 6; and a front cover 11 and a rear cover 12 which form an outer enclosure covering the display section 5, the controller 6, and the support 7.

The display section 5 has a vacuum vessel 13 as an airtight vessel, of which the interior is kept in vacuum. The vacuum vessel 13 has a face plate 15 having a display screen composed of an RGB fluorescent film and a high-voltage area of a metal back film formed on a glass substrate; a rear plate 16 having a display screen composed of an X-direction wiring, a Y-direction wiring, and electron emitting elements formed on the glass substrate; and a spacer 17 having substantially a frame shape provided between the face plate 15 and the rear plate 16.

A front plate 20 is provided at a position opposite to the front surface which is the display screen of the display section 5. The front plate 20 is made of a light-transmitting material such as a transparent glass material and has a function of an optical filter which improves visible display properties, a function of inhibiting electromagnetic waves produced from the interior electric circuits, and a function for protecting the interior thereof from dust or collision with an article. The electromagnetic wave inhibiting function of the front plate 20 is ensured by affixing opposite to the display section 5 a functional film (not shown) having a conductive layer having a resistance value of about $10^3$ $\Omega \cdot cm$ formed onto the back. In this embodiment, the display section 5 has a configuration in which the front plate and the airtight vessel including the face plate and the rear plate are separately prepared, and the front periphery of the face plate forming the front of the airtight vessel is secured to the support by bonding, and the front plate being held by clipping. A combined assembly of the airtight vessel and the front plate may be used as a display section, and the front periphery of the front plate serving as the front of the display section comprising the airtight vessel and a front surface of the front plate may be bonded to the support.

The front cover 11 is formed into a frame shape by having it cut into a prescribed size after an extruding fabrication using a rid and conductive material such as an aluminum alloy. The front cover 11 protects various electric circuit parts of the display section 5 and the controller 6 from dust or humidity. An opening 14 for exposing the front plate 20 is provided in the front cover 11.

On the inner periphery of the front cover 11, a support 11a for holding the front plate 20 periphery between the front cover 11 and the support 7 is integrally formed at a position close to the opening 14. A plurality of projections are provided on the back of the support 11a in contact with the front plate 20. These projections ensure holding of the periphery of the front plate 20 and prevent a positional shift from occurring.

On the inner periphery of the front cover 11, at a position near the support 11a, an engaging claw 11b having substantially an L-shaped cross-section engaging with the support 7 is formed as a projection by extruding fabrication. A support 26 which supports the periphery of the support 7 and a rear cover 12 is integrally formed at an end on the back side of the display unit 1 on the front cover 11.

The rear cover 12 is formed by press processing using a rigid metal material such as an aluminum alloy. The rear cover 12 prevents inflow of dust or foreign matter into the display unit 1 and is formed into a structure so as to permit each attachment and detachment by fixing screws 28 (described later) during maintenance.

The support 7 of the display unit 1 has a frame-shaped front-side support 21 which supports the front side of the vacuum vessel 13, and a back-side support 22 which supports the back side of the vacuum vessel 13 at a position opposite to the front-side support 21. The vacuum vessel 13 is housed between the front-side support 21 and the back-side support 22 of the support 7.

As shown in FIGS. 2 and 3, the front-side support 21 is formed into a frame shape by having it cut into a prescribed size after an extrusion using a conductive metal material and is arranged so as to surround the vacuum vessel 13 from the periphery front side through the side.

The front-side support 21 has four front-side support members 21a as shown in FIG. 3. These front-side support members 21a are connected to each other via four metal joint members 21b. Neighboring ends of the individual front-side members 21a are secured to the respective joint members by fixing screws 21c. By removing the fixing screws 21c, the front-side support 21 can be divided into four front-side support members 21a corresponding to the sides of the display section.

As shown in FIG. 2, the front-side support 21 has a support 23 which secures as a portion to which the front side of the vacuum vessel 13 is bonded at a position opposite to the front side of the vacuum vessel 13. The back of the support 23 is the surface opposite to the display section 5. To this surface, the double-sided adhesive tape 19 which is a bonding member for fixing the display section 5 is affixed, and is flat. The double-sided adhesive tape 19 is made by coating an acrylic adhesive onto the both surfaces of an acrylic or polyolefin-based foaming substrate. The periphery of the face plate 15 forming the front of the display section 5 is bonded and secured to the back of the support 23 via the double-sided adhesive tape. As a result of this bonding, the display section 5 is supported by the front-side support 21 forming the support 7. In this embodiment, all the four sides of the display section 5 are bonded to the support. Bonding may, however, be done on one or more and up to three sides. For each side, bonding is accomplished along substantially the entire length in this embodiment, but partial bonding may be conducted.

A conductive buffer member 27 for preventing breakage of the front plate 20 and for grounding the front plate 20 is arranged on the front face of the support 23 opposite to the periphery of the front plate 20. A receiving section 23a for positioning and receiving the conductive buffer member 27 is formed on the front face of the support section 23 of the front-side support 21.

The conductive buffer member 27 is formed into a frame shape, comprising conductive metal meshes filled with a foaming resin, provided over the entire periphery of the front plate. The conductive buffer member 27 prevents breakage including a chip in ridge of the periphery of the front plate 20 caused by elasticity of the foaming resin, and serves as an electric path for bringing the front plate 20 to an earth potential by electrically connecting the conductive layer of the functional film affixed to the front plate 20 and the metal front-side support 21.

The periphery of the front plate 20 is held via the conductive buffer member 27 between the support 23 and the support 11a of the front cover 11: the front plate is thus held and secured.

The front plate 20 may be fixed by bonding, not holding, between components. More specifically, it is possible to adopt a configuration in which the front plate 20 is bonded, by use of an adhesive member (double-sided adhesive tape, or a liquid adhesive), onto the back of the support section 11a of the front cover 11. Holding between components may be assisted by a bonding force. When bonding is excessively stiff, it is necessary to conduct a step of separation of the front cover 11 and the front plate 20. It is therefore desirable not to use an adhesive for fixing the front plate 20, or to use the smallest possible quantity thereof. An engaging claw 23b having substantially an L-shape engaging with an engaging claw 11b is integrally formed by extrusion in projection at a position corresponding to the engaging claw 11b of the front cover 11 on the support 23 of the front-side support 21. The engaging claw 23b of the support 23 of the front-side support 21 engages with the engaging claw 11b of the front cover 11.

The engaging section 24 to be engaged with a contact piece 36 (described later) formed on the back-side support 22 is formed integrally in projection on the inner periphery of the front-side support 21. The engaging section 24 is in contact with the contact piece 36 positioned on the outer periphery of the back-side support 22.

The front-side support 21 has a side forming a portion extending toward the back side beyond the rear plate of the display section from the support section 23 which is the portion to which the display section is to be bonded. The above-mentioned engaging section 24 is provided in the middle of this side. An attachment portion 25 to which the periphery of the rear cover 12 is to be attached is formed integrally with an end of the back of this side facing the back of the display unit 1. A plurality of throughholes (not shown) for fixing the rear cover 12 with fixing screws 28 are provided in this attachment portion 25. Screw holes (not shown) to which the fixing screws 28 are secured are provided in the support 26 of the front cover 11 at positions corresponding to the throughholes of the attachment portion 25. The attachment portion 25 of the front-side support 21 is held between the support 26 of the front cover 11 and the periphery of the rear cover 12. The support 26 of the front cover 11, the attachment portion 25 of the front-side support 21, and the periphery of the rear cover 12 are secured to each other with fixing screws 28.

The front-side support 21 is connected to the back-side support 22 by a screw 31 and forms the support 7. The screw 31 is inserted into a throughhole (not shown) provided through the contact piece 36 of the back-side support 22 and tightened into a screw hole (not shown) provided in the engaging portion 24 of the front-side support 21. Fixing of the back-side support 22 and the front-side support 21 by the screw 31 is conducted at a plurality of positions along the vacuum vessel 13.

A flat member of an aluminum alloy having a thickness of about 2 mm, formed by pressing, is used as the back-side support 22 in this embodiment. A plurality of electric circuit parts-mounting sections 34 mounting various electric circuit parts of the controller 6 are formed on the back of the back-side support 22 facing the rear cover 12. Screw holes (not shown) for fixing various electric circuit parts by fixing screws are provided in these electric circuit parts-mounting sections 34. A plurality of reinforcing ribs 35 for ensuring a prescribed rigidity are provided on the back of the back-side support 22.

A plurality of contact pieces 36 to be in contact with the engaging section 24 of the front-side support 21 are formed in projections on the outer periphery of the back-side support 22. These contact pieces 36 are formed at prescribed intervals along the outer periphery of the back-side support 22 at positions not overlapping the flexible cables 53 of the controller 6 described later.

The front cover 11, the rear cover 12, and the front-side support 21 are connected by a fixing screw 28 as shown in FIG. 2. The fixing screw 28 is inserted into a throughhole (not shown) of the rear cover 12 and a throughhole provided in the attachment portion 25 of the front-side support 21 and tightened into a screw hole in the support 26 of the front cover 11.

If the support 7 is deemed to be an internal support in the display unit 1, the rigid front cover 11 and rear cover 12 compose an external support. In the display unit 1 of this embodiment, the front-side support 21 forming the support 7 and the front cover 11 are connected by means of the fixing screw 28 in butt with a face corresponding to the side of the display unit 1, which is a surface other than the back face of this connection, and are brought into close contact. As a result, in the display unit 1, displacement of the internal support in two directions perpendicular to each other is regulated. At the same time, rigidity of the internal support and rigidity of the external support make up for each other, thus achieving a high rigidity for the display unit 1 as a whole.

The controller 6 of the display unit 1 comprises a Y-direction driver circuit 46 which generates an electric driving signal for display (selective driving by pulse width modulation); a signal processing circuit 47 which converts an analog signal into a digital signal and controls the electric circuit system; a power source unit (not shown) which generates a constant-voltage DC voltage to be fed to the electric circuits; and a signal input circuit (not shown) having a function of cutting off unnecessary signals from various entered signals from external sources such as NTSC (National Television System Committee) signals, video signals, and VGA (Video Graphics Array) signals. These circuits and power source units as a driving circuit drive the display section.

The controller 6 further comprises wiring 50 for transmitting a signal supplied from the signal processing circuit 47 to a Y-direction driver circuit 46, and an X-direction driver circuit (not shown) for supplying an electric driving signal (scanning signal) for display from the signal processing circuit 47 to matrix wiring of the rear plate 16.

The Y-direction driver circuit 46 is electrically connected via the flexible cable 53 to the rear plate 16 of the vacuum vessel 13. The flexible cable 53 is electrically and mechanically connected to the Y-direction driver circuit 46 via a detachable connector, and on the rear plate 16 side, is electrically and mechanically connected to an electrode section (connection terminal) provided at an end of Y-direction wiring printed on the rear plate 16, via an anisotropic conductive tape (not shown).

The X-direction driver circuits are arranged one each to the right and to the left of the display section 5 and supply power to the matrix wiring of the rear plate 16 via the flexible cable (not shown). The flexible cable is electrically and mechanically connected to the X-direction driver circuits via a detachable connector, and on the rear plate 16 side, is electrically and mechanically connected to an electrode section provided at an end of X-direction wiring printed on the rear plate 16, via an anisotropic conductive tape (not shown).

Although not shown, in a high-voltage cable electrically connecting a metal-back film of the face plate 15 and a high-voltage source circuit, the high-voltage source circuit side is electrically and mechanically connected via a connector for high voltage, and the face plate 15 side is electrically and mechanically connected to the metal-back film via a high-voltage terminal arranged in a throughhole provided in the rear plate 16 (details are as disclosed in Japanese Patent Application Laid-Open No. 7-235255).

The operational principle of the vacuum vessel 13 will now be described for the display unit 1 having the above-mentioned configuration.

The vacuum vessel 13 employs an electron emitting element as a display element. In this embodiment, among others, a surface transmitting type emission element is used as an electron emitting element. A fluorescence emitting light under the effect of electrons emitted by the electron emitting element is provided in the vacuum vessel 13 to make it possible to display an image or the like. The display section 5 causes emission of electrons from the electron emitting element of the rear plate 16 by impressing a voltage higher than 10 [V] between the X-direction wiring and the Y-direction wiring selected by the electric circuits. In the vacuum vessel 13, electrons emitted by a (+) potential of more than 10 [kV] supplied from an external high-voltage power source to the metal-back film on the vacuum gap side of the face plate 15 are accelerated and hit the fluorescent film, thus emitting light.

Sizes of various members of the display unit 1 of this embodiment in a state in which the display section 5 is supported by the support 7 will now be described with reference to the drawings.

First, sizes of the individual members A, B, $C_1$, and $D_1$ in the display unit 1 will be described.

In the display unit 1, as shown in FIG. 4, the distance between the front of the face plate 15 of the display section 5 and the back of the front plate 20 is assumed to have size A. In the display unit of this embodiment, size A is set to about 5 mm, taking into account the deflection and breakage of the front plate 20 upon loading an external force onto the front plate 20. A higher value of size A leads to a higher safety of the display section 5 but results in an increase in thickness of the display unit 1 as a whole.

The distance between the back of the back-side support 22 and the front of the rear cover 12 is assumed to be size B. Size B represents a space retained for housing electric circuit parts. In the display unit 1 of this embodiment, various electric circuit parts are designed with a small height (thickness direction of the back-side support 22), and optimization is tried by taking into account the magnitude of a heat releasing space for releasing the heat generated by the individual electric elements, and size B is set to a value of about 33 mm. The sizes A and B are set as distance values necessary commonly when determining a structure of the external enclosure, and when adopting a configuration different from that in the embodiment as a supporting structure of the display section 5 in examples described later.

The thickness of the front-side support 21 in a direction in parallel with the thickness direction of the display section 5 (not the thickness of the support built by combining a plurality of members formed separately, but the thickness of a part of the portion integrally formed) is assumed to be size $C_1$. An increase in size $C_1$ leads to improvement of torsion rigidity of the display unit 1 as a whole. In contrast, a decrease in size $C_1$ corresponds to a decrease in torsion rigidity for the entire display unit 1. That is, in order to protect the display section 5 from various external forces, torsion rigidity of the display unit 1 should preferably be the highest possible. It is therefore desirable to use the largest possible size $C_1$.

The total thickness of the display unit 1 of this embodiment is expressed as size $D_1$, which is set as about 61 mm.

Figure 5:
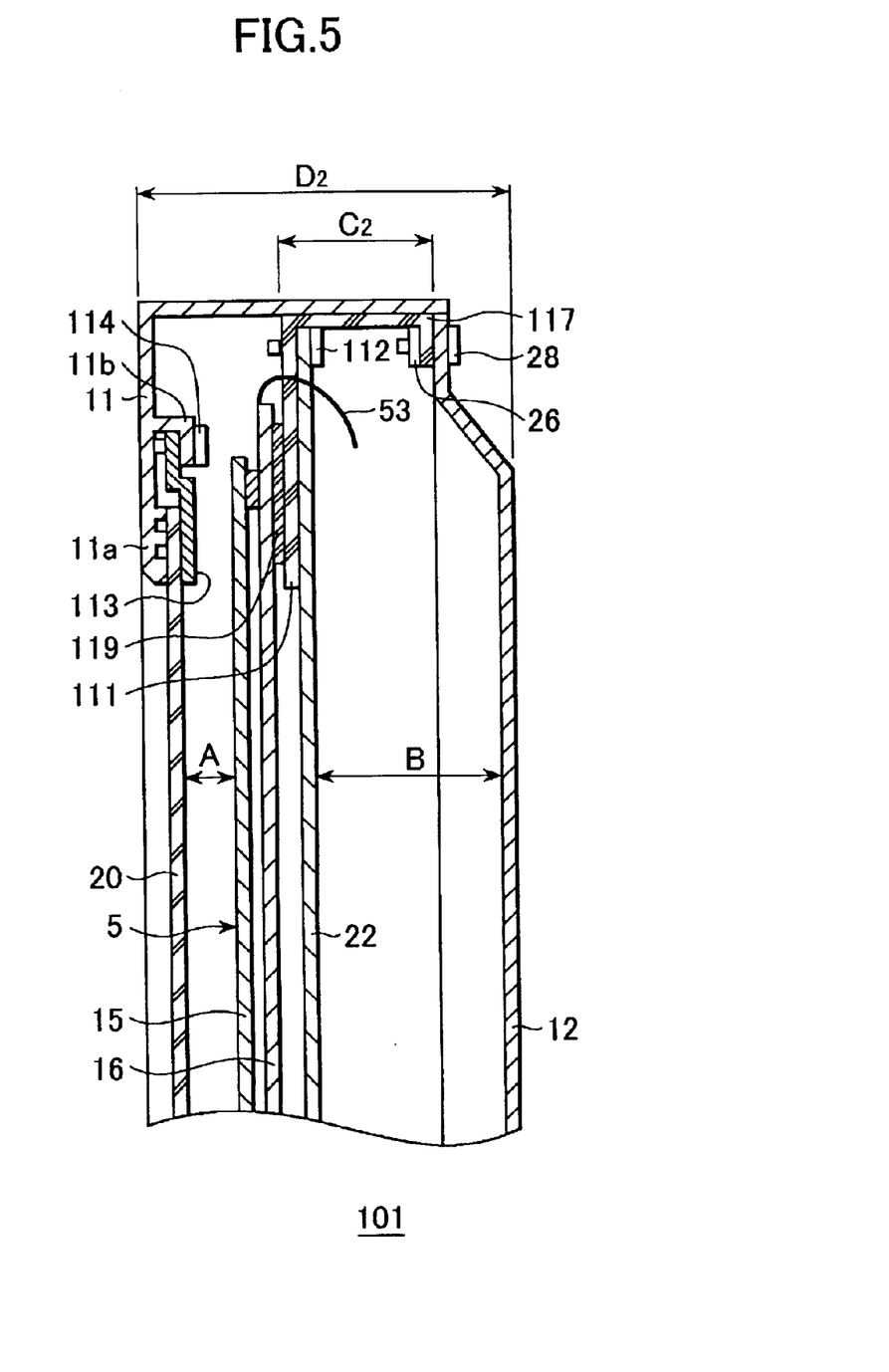
FIG. 5 is a longitudinal sectional view illustrating the display unit of a first comparative example.
Figure 6:
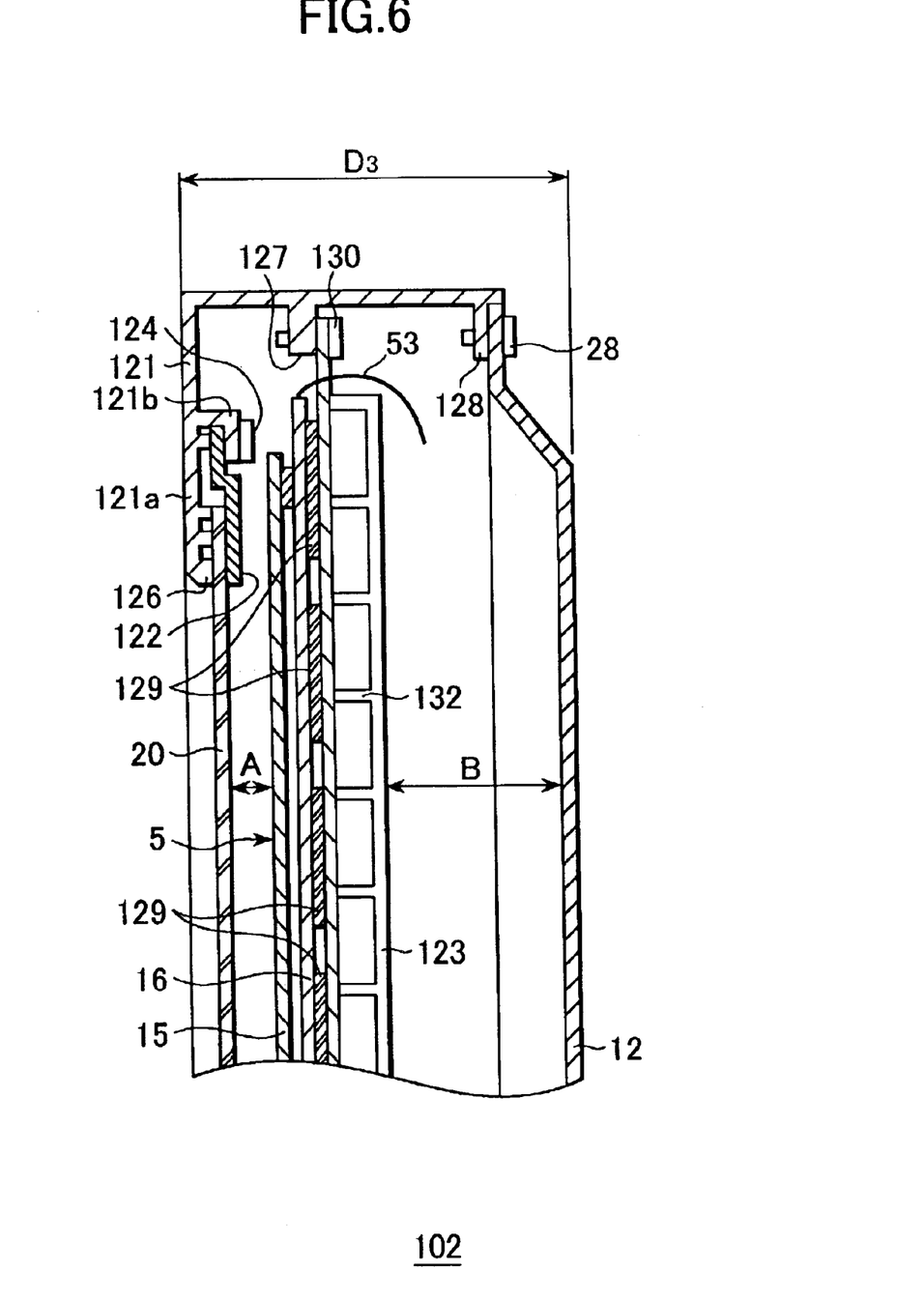
FIG. 6 is a longitudinal sectional view illustrating the display unit of a second comparative example.

For the purpose of confirming effectiveness of the display unit 1 of this embodiment, for which sizes A, B, $C_1$, and $D_1$ are thus set, the display units of reference cases will briefly be described with reference to the drawings. In the display units of the reference cases, the same members as in the display unit 1 of the above-mentioned embodiment are represented by the same reference numerals, and the description thereof is omitted. FIG. 5 is a longitudinal sectional view partially illustrating the display unit of a first reference case; and FIG. 6 is a longitudinal sectional view partially illustrating the display unit of a second reference case.

As shown in FIG. 5, the display unit 101 of the first reference case has a substantially L-shaped support 111 supporting a display section 5, and a fixing screw 112 for fixing a back-side support 22 to the support 111. The display unit 101 further comprises a holding member 113 for holding the periphery of a front plate 20 in a gap from a support 11a of a front cover 11. The front plate 20 is held between the supporting section 11a of the front cover 11 and an end of a holding member 113, and the other end of the holding member 113 is engaged with an engaging claw 11b of the front cover 11 and fixed by a fixing screw 114.

In this display unit 101 of the first reference case, a rear plate 16 of the display section 5 is bonded and secured to the support 111 arranged on the back side of the display section 5 by means of a double-sided adhesive tape 119. One side of the double-sided adhesive tape 119 is affixed to the entire periphery of the back of the rear plate 16, and the other side of the double-sided adhesive tape 119 is pasted to the support 111, thereby being supported by the support 111.

The support 111 has a supporting section 117 at an end on the back side of the display unit 101. An attachment portion 26 of the front cover 11 and the periphery of the rear cover 12 are fixed to this supporting section 117 by fixing screws 28. Insertion ports (not shown) for insertion of a flexible cable 53 for drawing out the flexible cable onto the back side of the back-side support 22 are provided on the support 111 and the back-side support 22.

The insertion hole must have an opening width larger than the width of the flexible cable 53 by about 1 to 2 mm. It is necessary to form an opening size of about 58 mm×5 mm, and to provide such insertion ports at twelve positions along the longer side and eight positions along the shorter side of the display unit 1 having a rectangular shape.

In the display unit 101 of the first reference case having the above-mentioned configuration, the distance between the front of the face plate 15 of the display section 5 and the front plate 20, and the distance between the back of the back-side support 22 and the front of the rear cover 12 are equal to sizes A and B of the display unit 1 of this embodiment, respectively. In this display unit 101, however, the thickness size $C_2$ of the support 111 in a direction in parallel with the thickness direction of the display section 5 is smaller than size $C_1$. By providing an insertion port in the support 111, the strength of the support 111 seriously decreases as compared with the strength of the front-side support 21 of the display unit 1 of this embodiment, and the torsion rigidity of the entire display unit 101 is reduced from that in the embodiment of the present invention. In addition, the total thickness $D_2$ of the display unit 101 of the first reference case becomes larger than the total thickness $D_1$ of the display unit 1 of this embodiment.

As shown in FIG. 6, a display unit 102 of a second reference case comprises a front cover 121 serving as an outer enclosure and a holding member 122 for holding the front plate 20 in the gap from the front cover 121. The periphery of the front plate 20 is held between the supporting section 121a of the front cover 121 and an end of the holding member 122, and the other end of the holding member 122 engages with the engaging claw 121b of the front cover 121 and is fixed by a fixing screw 124.

In the display unit 102 of the second reference case, a rear plate 16 of the display section 5 is bonded and fixed to a back-side chassis 123 arranged on the back side of the display section 5 by means of a plurality of double-sided adhesive tape 129. In the display section 5, an end of the double-sided adhesive tape 129 is affixed to the back of the rear plate 16, and the other end of the double-sided adhesive tape 129 is affixed to the back-side chassis 123. The display section 5 is thus supported by the back-side chassis 123.

An opening 126 for exposing the front plate 20 is provided in the front cover 121 formed into a frame shape. A supporting section 121a supporting the front plate 20 is formed at a portion adjacent to the opening 126 integrally with the front cover 121. On the front cover 121, substantially an L-shaped engaging claw 121b is formed integrally in projection, engaging with the holding member 122.

On the inner periphery of the front cover 121, a support 127 supporting the back-side chassis 123 is formed integrally in projection. The periphery of the back-side chassis 123 is fixed to the support 127 by a fixing screw 130.

In the front cover 121, a support 128 is formed integrally with an end on the back side of the display unit 102, and the periphery of the rear cover 12 is fixed to the support 128 by a fixing screw 28.

With a view to protecting the display section 5 from external forces and achieving a lighter weight of the display unit 102, the back-side chassis 123 has a sectional shape of a hollow structure in which a plurality of reinforcing ribs 132 are arranged. In order to draw out the flexible cable 53 onto the back side of the back-side chassis 123, an insertion port (not shown) for insertion of the flexible cable 53 is provided in the back-side chassis 123.

According to the display unit 102 of the second reference case having the above-mentioned configuration, a sufficient strength of the back-side chassis 123 alone is ensured. However, because the insertion port for drawing of the flexible cable 53 is located near the periphery of the back-side chassis 123 to which the support 127 of the front cover 121 is secured, the torsion rigidity of the display unit 102 as a whole decreases as compared with that of the display unit of this embodiment.

In the display unit 102, the distance between the front of the face plate 15 of the display section 5 and the front plate 20 and the distance between the back of the back-side chassis 123 and the front of the rear cover 12 are equal to sizes A and B of the display unit 1 of this embodiment, respectively. In the display unit 102, however, the total thickness $D_3$ of the display unit 102 becomes larger than the total thickness $D_1$ of the display unit 1 of this embodiment, depending upon the thickness of the back-side chassis 123.

In the display unit 102 of the second reference case, in which the back-side chassis 123 houses and supports the electric circuit parts, heat propagates from the electric circuit parts to the double-sided adhesive tape 129 and causes a decrease in the bonding strength. For the display unit 102 of the second reference case, therefore, it is necessary either to use a relatively expensive double-sided adhesive tape excellent in high-temperature properties or to increase the consumption of the double-sided adhesive tape.

More specifically, the embodiment of the present invention provides the following advantages. 1) The display unit can easily maintain rigidity of the support supporting the display section, since it can be designed such that the distance from a front end to a back end of the support may become long and permit reduction of the thickness of the support. This results in the possibility of reducing the weight of the display unit as a whole. Therefore, for example, when hanging a display unit applied for a wall-hanging television set, it is not necessary, or hardly necessary, to take countermeasures such as reinforcement of the wall so that the wall will withstand the weight of the display unit, thus increasing the commercial value of the display unit.

2) In order to make the display unit lighter in weight and to secure the rigidity of the support on the back of the display section by forming a hollow structure and a reinforcement rib by extrusion processing, the support is made thick. So the necessity of enlarging space on the back of the display section is decreased. As a result, it is possible to reduce the thickness of the entire display unit, and to improve the slim feeling of the wall-hanging television set, thus improving the commercial value of the product.

3) The necessity of fixing the vacuum vessel composing the display unit with a double-sided adhesive tape over the entire surface is eliminated. When dismantling the unit for recycling or the like, it is easier to separate the adhesive of the double-sided adhesive tape, thus permitting reduction of the recycling cost. It is hardly necessary to use a relatively expensive double-sided adhesive tape ensuring satisfactory high-temperature properties for the display unit, and this makes it possible to inhibit the product cost.

As in the display units 101 and 102 of the first and second reference cases shown in FIGS. 5 and 6, the configuration in which the back side of the display section 5 is fixed by use of double-sided adhesive tapes 119 and 129 may be applied in combination with the configuration of this embodiment. From the point of view of reducing the weight of the unit as a whole, however, it is desirable to adopt a configuration in which the back side of the display section 5 is not fixed, or only minimal portions are fixed complementally as required.

Finally, a method for dismantling the display unit 1 of this embodiment will be briefly described.

The method comprises the steps of removing the plurality of fixing screws 28 fixed around the periphery of the rear cover 12 of the display unit 1 to separate the rear cover 12, and separating the front cover 11 to remove the front plate 20. Various cables including the flexible cable 53 are removed from the connector. The electric circuit parts such as the Y-direction driver circuit 46 are removed from the display unit 1 by removing the plurality of fixing screws (not shown) from the back-side support 22. The back-side support 22 is removed from the front-side support 21 by removing the screws 31 on the periphery of the back-side support 22.

The fixing screws 21c fixing the front side support members 21a in the state in which these members are connected by the connecting member 21b are removed from the connecting members 21b, and all the connecting members 21b are separated from the four corners of the front-side support 21.

Finally, the display section 5 and the front-side supporting members 21a are separated. By rotating the front-side supporting member 21a toward the front side of the display section 5 (direction of separation represented by an arrow S in FIG. 2) while holding the portion near the attachment portion 25 of an arbitrary (any of the four) front-side supporting member 21a, the adhesive is smoothly separated from one end side of the double-sided adhesive tape 19. It is thus possible to satisfactorily remove the front-side supporting members 21a without breaking the display section 5. At this point in time, the front-side supporting member 21a is smoothly turned in the S-direction, without causing interference to the other component members of the display unit 1.

In the same manner as in the above-mentioned operations, the other front-side supporting members 21a are removed from the display section 5, thus completing the dismantling operations. The dismantling operations described above can be accomplished without using any tool other than a screwdriver for removing the screws 21c, 28, 31, and the screws for fixation of electric circuit parts.

According to the display unit 1 of the above-mentioned embodiment, the portions surrounding the front side of the display section 5 are fixed and supported by the support 23 of the front-side support 21 via the double-sided adhesive tape 19. This permits reduction of thickness of the display unit 1 as a whole and weight reduction, and it is also possible to adopt a relatively inexpensive double-sided adhesive tape having a lower heat resistance as the adhesive, hence reducing the manufacturing cost.

According to the display unit 1, the front cover 11 and the front plate 20 can be easily separated from the rear cover 12. This permits reduction both of the operating time for dismantling of the display unit 1 and of the dismantling cost.

According to the display unit 1, furthermore, it is not necessary to have skill for the dismantling operation or special tools when dismantling the display section 5 and the front-side support 21. It is therefore possible to dismantle the unit easily and certainly, and to prevent breakage of the display unit during dismantling operation. As a result, according to the display unit 1, the removed display section 5 and other component members such as the front-side support 21 can be reused for another display unit, and the value as a product capable of being recycled is improved.

The support 7 forms substantially a box shape by comprising the back-side support 22 and the front-side support 21. As a result, the thickness is relative small, but a sufficient rigidity is ensured against pressure from outside.

The display unit 1 of the present invention is applicable in a monitor of a television set and a computer terminal, and is suitably applicable in an advertising display, a sign, and various other electronic appliances such as a video camera.

What is claimed is:

1. A display unit comprising:
    a display section to display images, said display section having a front side and a back side, with a face plate and a rear plate, said rear plate being arranged nearer the back side in relation to said face plate;
    a support which supports said display section; and
    a bonding member for bonding said display section and said support,
    wherein said bonding member bonds said display section and said support on a periphery of the front side of said display section.
2. The display unit according to claim 1, wherein:
    said support has a portion extending from the bonded portion of said display section toward a rear side beyond said rear plate.
3. The display unit according to claim 1, wherein:
    said display section comprises a rectangular main surface, and said support connects a plurality of supporting members corresponding to individual sides on a periphery of said display section.
4. The display unit according to claim 3, wherein:
    said individual supporting members are connected with screws.
5. The display unit according to claim 3, wherein:
    said supporting members, when making relative displacement until said supporting members and said display section are separated from each other, are formed into a shape not having a portion that interferes members other than said supporting members of said display unit.
6. A display unit according to claim 3, wherein:
    said face plate and said rear plate are mechanically attached.
7. The display unit according to claim 1, further comprising:
    a driving circuit which drives said display section at a position closer to a back side of said display unit than said display section; and
    wiring drawn from an end portion of said display section and connected to said driving circuit.
8. The display unit according to claim 7, wherein:
    said support has a portion extending from the bonded portion of said display section closer to the back side of the display unit than said rear plate; and
    the bonded portion of said display section and said portion extending from the bonded portion closer toward the back side of the display unit than said rear plate are integrally formed.
9. The display unit according to claim 8, wherein:
    said wiring passes through the integrated form of the bonded portion of said display section and the portion extending from the bonded portion toward the back side of the display unit beyond said rear plate, to connect said driving circuit and said display section.
10. The display unit according to claim 1, further comprising:
    a front plate positioned opposite to said face plate of said display section,
    wherein a rear periphery of said front plate is bonded to said support.
11. The display unit according to claim 1, wherein said support comprises a frame-shaped front-side support which supports the front side of said display section.
12. The display unit according to claim 11, wherein said frame-shaped front-side support divides into four front-side support members corresponding to four sides of said display section.
13. The display unit according to claim 11, said support further comprising:
    a back-side support which supports the back side of said display section at a position opposite to said front-side support.
14. The display unit according to claim 11, wherein said front-side support has a first engaging claw having substantially an L-shape, further comprising:
    a front cover at a front of said display unit, said front cover having a second engaging claw having substantially an L-shape at a position corresponding to said first engaging claw of said front-side support;
    wherein said first engaging claw engages with said second engaging claw.
15. The display unit according to claim 1, wherein said bonding member adheres to both the front side of said display section and said support.
16. The display unit according to claim 1, wherein said bonding member bonds said display section and said support so that the display section is supported by said support.

* * * * *

UNITED STATES PATENT AND TRADEMARK OFFICE
CERTIFICATE OF CORRECTION

PATENT NO. : 7,120,010 B2  Page 1 of 1
APPLICATION NO. : 10/318069
DATED : October 10, 2006
INVENTOR(S) : Hisao Tajima It is certified that error appears in the above-identified patent and that said Letters Patent is hereby corrected as shown below:

<u>COLUMN 3</u>:

Line 47, "rid" should read --rigid--.

<u>COLUMN 12</u>:

Line 5, "interferes" should read --interferes with--.

Signed and Sealed this

Fifteenth Day of April, 2008

JON W. DUDAS
*Director of the United States Patent and Trademark Office*